United States Patent
Holmes et al.

(10) Patent No.: US 8,991,428 B2
(45) Date of Patent: Mar. 31, 2015

(54) DIE CAST SLEEVE WITH STABILITY ENHANCEMENT FEATURES OCCUPYING A SMALL PACKAGE SPACE

(75) Inventors: Garrett R. Holmes, Ortonville, MI (US); Michael E. Jones, Lake Orion, MI (US); Jeffrey J. Waterstredt, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 775 days.

(21) Appl. No.: 13/260,960

(22) PCT Filed: Jan. 25, 2010

(86) PCT No.: PCT/US2010/021924
§ 371 (c)(1),
(2), (4) Date: Sep. 29, 2011

(87) PCT Pub. No.: WO2010/117477
PCT Pub. Date: Oct. 14, 2010

(65) Prior Publication Data
US 2012/0018656 A1    Jan. 26, 2012

Related U.S. Application Data

(60) Provisional application No. 61/211,434, filed on Mar. 30, 2009.

(51) Int. Cl.
*F16K 11/07* (2006.01)
*F16K 31/06* (2006.01)
*F16H 61/02* (2006.01)

(52) U.S. Cl.
CPC ............. *F16K 11/07* (2013.01); *F16K 31/0613* (2013.01); *F16H 61/0276* (2013.01)

USPC .................................. 137/625.65; 251/129.07

(58) Field of Classification Search
CPC . F16K 31/0613; F16K 11/07; F15B 13/0402; F15B 13/044
USPC .................................. 137/625.65; 251/129.07
See application file for complete search history.

(56) References Cited

U.S. PATENT DOCUMENTS

| | | | | |
|---|---|---|---|---|
| 3,324,889 | A | * | 6/1967 | Batts .......................... 137/625.65 |
| 3,538,954 | A | * | 11/1970 | Bowsher et al. .......... 137/625.65 |
| 3,747,623 | A | * | 7/1973 | Greenwood et al. ..... 137/625.65 |
| 4,531,708 | A | | 7/1985 | Livet |
| 4,838,313 | A | * | 6/1989 | Kobayashi et al. ....... 137/625.65 |
| 4,951,878 | A | * | 8/1990 | Casey et al. ............... 251/129.15 |
| 4,971,116 | A | * | 11/1990 | Suzuki et al. ............. 137/625.65 |
| 5,186,204 | A | * | 2/1993 | Oka et al. .................. 137/625.65 |
| 6,036,167 | A | | 3/2000 | Wade |

(Continued)

FOREIGN PATENT DOCUMENTS

JP    2005030529 A    2/2005
KR    100892832 B1    4/2009

OTHER PUBLICATIONS

International Search Report and Written Opinion for Application PCT/US2010/021924 Filed on Aug. 31, 2010.

*Primary Examiner* — John Rivell
(74) *Attorney, Agent, or Firm* — Warn Partners, P.C.

(57) ABSTRACT

In a preferred embodiment, the present solenoid control valve is provided which has a valve sleeve having upper and lower feedback chambers which are connected to control pressure by an exterior surface longitudinal slot or slots.

16 Claims, 2 Drawing Sheets

(56) References Cited

U.S. PATENT DOCUMENTS

| | | | |
|---|---|---|---|
| 6,453,947 B1 * | 9/2002 | Inoue et al. | 137/625.65 |
| 6,907,901 B2 * | 6/2005 | Holmes et al. | 137/625.65 |
| 7,082,965 B2 * | 8/2006 | Holmes et al. | 137/625.65 |
| 7,210,501 B2 * | 5/2007 | Neff et al | 137/625.65 |
| 7,412,989 B2 | 8/2008 | Segi et al. | |
| 7,950,416 B2 * | 5/2011 | Nakai et al. | 137/625.65 |
| 2013/0126768 A1 * | 5/2013 | Waterstredt | 251/129.15 |

* cited by examiner

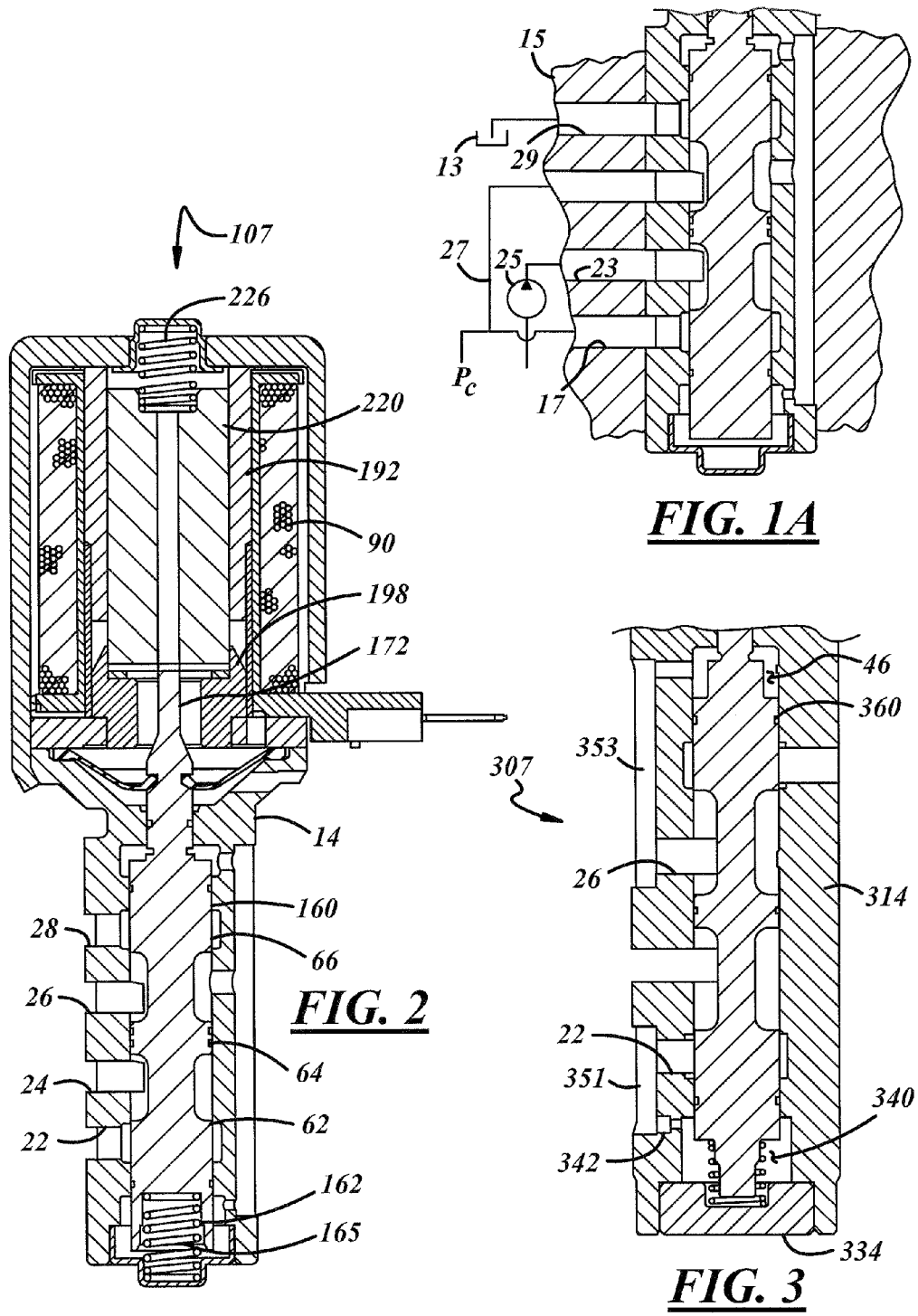

DIE CAST SLEEVE WITH STABILITY ENHANCEMENT FEATURES OCCUPYING A SMALL PACKAGE SPACE

FIELD OF THE INVENTION

The present invention relates to solenoid valves, especially solenoid valves useful in controlling clutches in an automatic vehicle transmission, especially dual clutch type transmissions.

BACKGROUND OF THE INVENTION

Automatic transmission initially employed fluid logic and a torque converter to effectuate the shifting of the transmission ratios automatically without operator input. To improve fuel efficiency to the control of various clutches utilized in shifting the gears in automatic transmission in combination with solenoid valves has been modified to use an electronic controller rather than relying upon the fluid logic. In many applications, the solenoid valves utilized are proportional type valves. Often, the solenoid valves must be shut on and off at very short intervals. This can often cause the valves to be unstable in their operation. It is also desirable to provide such solenoid valves in very compact packages. To provide a solenoid valve which is proportional operated and that which has a very stable operation and which can also be provided in a small package is highly desirable.

SUMMARY OF THE INVENTION

To make manifest the above noted and other desires, a revelation of the present invention is brought forth. In a preferred embodiment, the present invention provides a solenoid control valve which has metered out flow from the supply pressure to the control pressure and metered out flow from the control pressure and metered out flow from the control pressure to the exhaust. A valve sleeve is provided which has upper and lower feedback chambers. The feedback chambers are connected with the control pressure by exterior surface longitudinal slot or slots.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a cutout sectional view of a portion of a control valve of the present invention illustrating the fluid connections between a valve sleeve inserted within a valve housing;

FIG. 2 is a sectional view of a preferred embodiment control valve of the present invention in the normally low (closed) configuration;

FIG. 3 is a partial sectional view of an alternate preferred embodiment control valve of the present invention.

DETAILED DESCRIPTION OF THE PREFERRED EMBODIMENTS

Figure 1B:
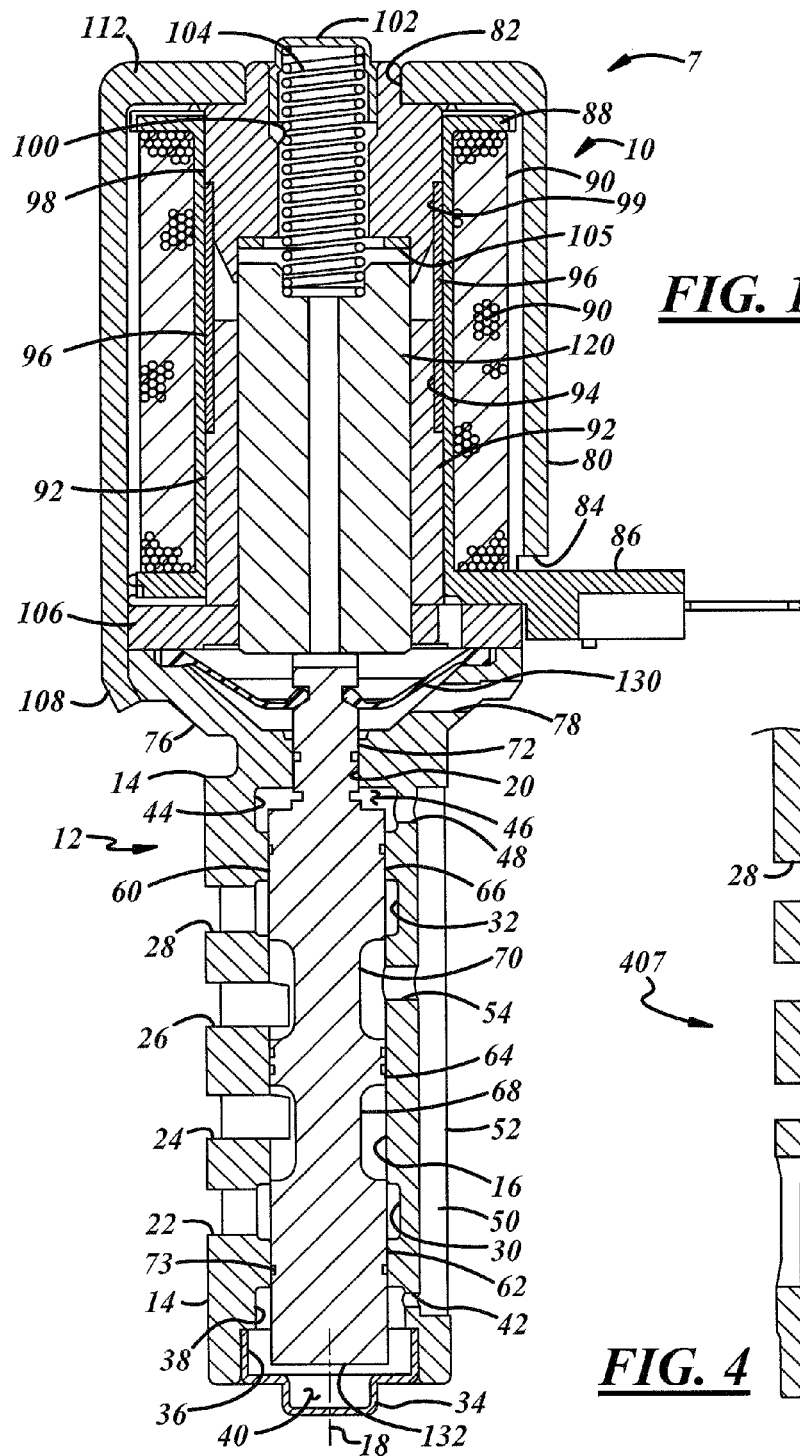
FIG. 1B is a sectional view of a preferred embodiment control valve according to the present invention in a normally high configuration.

Referring to FIGS. 1A and 1B, a normally high version of a control valve 7 of the present invention is presented. The control valve 7 has a solenoid portion 10. The control valve 7 also has a hydraulic portion 12. The hydraulic portion 12 has a valve sleeve 14. The valve sleeve 14 can be fabricated from a number of suitable metals or polymeric materials, but in most instances, it is typically preferable to be fabricated from a die cast and machined aluminum. The valve sleeve 14 has a central spool bore 16. The spool bore 16 has a central axis 18 which is co-terminus with an axis of a stem bore 20. The valve sleeve 14 has a series of radial passages which intercept the spool bore 16. Passage 22 is connected with a control pressure passage 17 in a valve housing 15 (FIG. 1A) encircling the valve sleeve 14. The control pressure (Pc) is typically that of a clutch (not shown) in an automatic transmission. Radial inlet passage 24 via housing passage 23 connects the valve sleeve 14 with a pressure supply source typically provided by a hydraulic pump 25. Passages 26 and 22 are juxtaposed by radial passage 24. Radial passage 26 is connected with the control pressure via housing passage 27. Radial passage 26 typically acts as an inlet for control pressure. Radial passage 22 typically acts as an outlet for control pressure. Radial outlet passage 28 via housing passage 29 is typically utilized to connect a hydraulic exhaust or sump 13 with the spool bore 16. Adjacent to the control and exhaust pressure passages 22 and 28, the bore 16 has two annular enlargements 30 and 32.

Valve sleeve 14 at its extreme end has an axial opening which is plugged by a cap 34 which fits into an annular enlargement 36. The annular enlargement 36 connected with an annular enlargement 38. The annular enlargement 36, 38 along with the cap 34 form a lower feedback chamber 40. The annular enlargement 38 is radially intersected by a radial orifice 42. The ratio of the area of the orifice 42 to the volume of the feedback chamber 40 is small enough that the feedback chamber 40 provides a dampening function to movement of the valve spool 60.

Towards an upper end (or closer to the solenoid portion 10) of the spool bore 16, the valve sleeve has an annular enlargement 44. The annular enlargement 44 forms an upper feedback chamber. The upper feedback chamber 46 has a radial orifice 48. The orifice 48 is typically larger than the orifice 42. The radial orifice 48 is fluidly connected with a longitudinal slot 50 that extends along an outer radial surface of the valve sleeve 14. Longitudinal slot 50 along its outer radial edge 52 contacts the housing 15. The longitudinal slot 50 fluidly connects the lower feedback chamber 40 with the upper feedback chamber 46. The longitudinal slot 50 is also fluidly connected with the valve spool bore 16 by a radial intermediate orifice 54. Intermediate orifice 54 is positioned between the exhaust 29 and the radial inlet passage 24.

Slidably mounted within the valve spool bore 16 is valve spool 60. Valve spool 60 has a lower landing 62, a middle landing 64 and an upper landing 66. Separating the landings 62 and 64 is a reduced diameter portion or shank 68. Separating the landings 66 and 64 is a shank 70 which is additionally exposed to the radial orifice 54. At the top of the spool 60 is a stem 72. The spool 60 also has a series of balancing annular grooves 73. The spool 60 in the configuration shown has a metered out configuration for supply pressure to control pressure and a metered out configuration for control pressure to exhaust. Movement of the valve spool 60 downward from the position shown in FIG. 1 causes fluid adjacent the spool shank 68 to be metered out from the supply pressure to the control pressure and thereafter exit the control pressure outlet passage 22. A top portion of the valve sleeve 14 spreads out into an annular yolk 76. The annular yolk 76 is intersected by a radial side bore 78. The solenoid portion 10 has a can or housing 80. The housing 80 has a central top aperture 82. The housing 80 is crimped to the yolk 76 of the valve sleeve and also has a side opening 84 to allow for a connection within an electrical connector 86. Positioned within the housing 80 is an annular bobbin 88. The bobbin 88 supports a coil bundle 90. Inside the bobbin 88 is a flux tube 92. The flux tube 92 along its upper portion has on its outer radial surface a longitudinal annular groove 94. Supported on the groove 94 by an interference fit is an alignment tube 96. The alignment tube 96 is typically fabricated from a non-magnetic material like brass or stainless steel. The alignment tube positions an interference fitted pole piece 98. The pole piece 98 has an annular groove for acceptance of the alignment tube 96. The pole piece 98 has a central multi-dimensional bore 100 that has its extreme end closed by a cap 102. The cap 102 acts as a retainer for a biasing spring 104. The biasing spring 104 biases an armature 120 against the valve stem 72. Positioned under the flux tube 92 is a ferro-magnetic flux washer 106. When a housing peripheral portion 108 is crimped to the yolk 76 of the valve sleeve, the yolk 76 is in compression with the flux washer 106, flux tube 92, alignment tube 96, pole piece 98 and the top cover portion 112 of the housing. When the coil 90 is energized, the flux loop includes the pole piece 98, flux tube 92, and flux washer 106 and the housing 80.

The alignment tube 96 precisely locates the flux tube 92 to the pole piece 98. Slidably mounted within the flux tube 92 is an armature 120. The armature 120 outside diameter is plated or coated with a hard, low-friction, non-magnetic or semi-magnetic material such as nickel phosphorous or chrome in a thickness in approximately 50 micron. The plating or coating later serves a dual purpose of providing a hard, low friction bearing surface and maintaining a non-magnetic (or semi-magnetic) "air-gap". The plated or coated armature outside diameter slides directly on the flux tube 92 inside diameter. The clearance between the armature 120 OD and the flux tube 92 ID is minimized to thus minimize the relative eccentricity of the tube components. By minimizing the relative eccentricity, magnetic slide-loading is also minimized which in turn minimizes friction and hysteresis. At the same time the magnetic return gap is also held to a very small distance (equal to the layer thickness; approximately 50 micron) so that solenoid efficiency is maximized. A non-magnetic washer 105 prevents the armature 120 from "locking" with the pole piece 98.

A diaphragm 130 is located between the yolk 76 of the valve sleeve 14 and the solenoid portion 10 to prevent contaminated oil, typically found in automatic transmission fluid, from being transferred into the solenoid portion 10. Typically the diaphragm 130 will be shaped such that volume displacement in the solenoid portion of the solenoid valve 7 will be minimized regardless of the position of the valve spool 60.

As mentioned previously, the solenoid valve 7 is biased to be normally high. Therefore, in most situations, the spring 104 positions the armature 120 to position the valve spool 60 so that oil surrounding the annular groove 68 of the valve spool is being metered out from the supply inlet passage 24 to the control pressure outlet 22. In the normal position, fluid exiting orifice 54 travels through slot 50 and then through orifice 42 to pressurize the feedback chamber 40. The feedback chamber 40 acts against the full cross-sectional surface area of the valve spool along the surface 132 which is greater than the surface acted upon within the upper feedback chamber 46 due to the diameter of the stem 20. Accordingly, there is upward biasing force acting upon the spool 60 which keeps the spool 60 in contact with the armature 120. In an embodiment (not shown) the biasing force can be supplemented by a spring positioned within the chamber 40 pushing against the valve spool 60. To reverse the position of the valve, the solenoid coil 90 is energized causing the armature 120 to be attracted against the force of the biasing of spring 104 to be attracted to the pole piece 98 thereby causing the fluid about the reduced diameter portion 70 to be metered out to the exhaust 28 when the fluid from the control pressure inlet 26 is connected therewith. When the fluid is flowing to the exhaust, the transient flow factors act upon the valve spool 60 in a direction to close, thus having a stability effect.

By using two feedback chambers 40 and 46 that act opposite of one another, the total volume of oil that is pumped in and out of the feedback chambers 40 and 46 is maximized. The larger feedback chamber 46 has an orifice 42 sized to balance damping for stability and cold response of the spool valve 60. The size of orifice 42 can be customized for a given clutch or transmission application. Typically, the orifice 48 between the longitudinal slot 50 and the larger feedback chamber 46 is sized greater than the orifice 42 between the longitudinal slot 50 and the lower feedback chamber 40.

Referring to FIG. 2, a normally low valve 107 according the present invention is provided. The valve 107 has a valve sleeve which is essentially very similar to or identical to the previously described valve sleeve 14. The valve 107 has a valve spool 160 having landings 66, 64 and 62 essentially similar or identical to valves previously described in relationship to the valve spool 60. The valve spool 160 additionally has an indent 162 along its lower end which provides a retainer for a biasing spring 165. Additionally, the valve spool 160 differs from the valve spool 60 in that it has a stem 172 which is somewhat more elongated. The positions of a flux tube 192 and pole piece 198 are essentially reversed as compared with the control valve 7. Actuation of the coil 90 of the solenoid 107 causes an armature 220 to be pulled downward cutting off the connection of the control pressure inlet 26 with the exhaust 28 and causing a connection of the supply pressure 24 passage with the control pressure passage 22. In an embodiment (not shown) the spring 226 can be eliminated.

FIG. 3 is a partial view of an alternative preferred embodiment 307 of the present invention. The embodiment 307 can be utilized in normally open or normally closed configurations. Slidably mounted within valve sleeve 314 is a valve spool 360 essentially similar or identical to previously described valve spool 60. Longitudinal slot 353 of the valve spool fluidly connects control outlet 26 with an upper chamber 46. Longitudinal slot 351 fluidly connects through an orifice 342 a lower feedback chamber 340 with a control passage outlet 22. A cap 334 closes off the lower feedback chamber 340.

Figure 4:
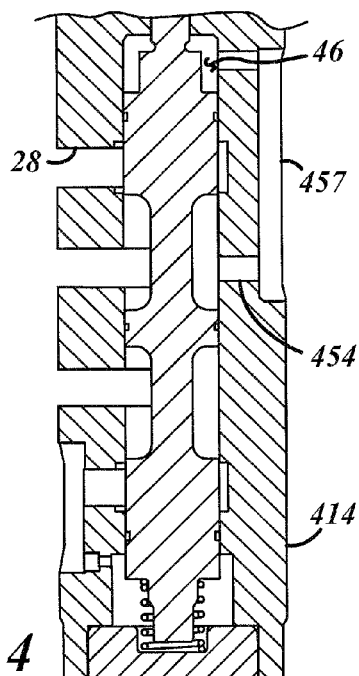
FIG. 4 is a partial sectional view of an alternate preferred embodiment control valve of the present invention.

Referring to FIG. 4, an embodiment 407 if the present invention is provided. Control valve 407 has a sleeve 414 having a slot 457 which fluidly connects the upper chamber 46 with an interior of the valve sleeve 414 via an orifice 454. This arrangement allows the upper feedback chamber 46 to fluidly connect with the control pressure while bypassing the more adjacent exhaust outlet 28 in a manner similar of that of longitudinal slot 52 shown in FIG. 1B.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A control valve comprising:
   a solenoid;
   a valve spool moved by said solenoid;
   a valve sleeve encircling said valve spool having a supply pressure inlet, at least one control pressure outlet/inlet and an exhaust outlet, said valve sleeve providing upper and lower feedback chambers for said valve spool connected with control pressure by at least one exterior surface longitudinal slot of said valve sleeve; and
   wherein said exhaust outlet is more adjacent to said upper feedback chamber than said control pressure outlet/inlet and wherein said one exterior surface longitudinal slot fluidly connects said upper feedback chamber with said control pressure via an orifice intersecting with an interior of said sleeve which bypasses said exhaust outlet, and wherein said one exterior surface longitudinal slot is connected by said orifice with a portion of the sleeve facing a shank separating spool landings and said valve spool is metered out to exhaust and said orifice connection with said one exterior surface longitudinal slot is between said control pressure outlet/inlet and said exhaust outlet.

2. A control valve as described in claim 1 having a single longitudinal slot intersecting with said upper and lower feedback chambers.

3. A control valve as described in claim 1 wherein said valve sleeve has a control inlet and one control outlet juxtaposed by a supply pressure inlet.

4. A control valve as described in claim 3 wherein said valve spool is metered out from said supply pressure inlet to said control pressure outlet.

5. A control valve as described in claim 1 wherein said valve sleeve is die cast.

6. A control valve as described in claim 1 wherein said longitudinal slot is connected to said upper feedback chamber by an orifice opening.

7. A control valve as described in claim 1 wherein said longitudinal slot is connected with said lower feedback chamber by an orifice opening.

8. A control valve as described in claim 1 wherein said longitudinal slot is connected by orifices with said upper and lower feedback chambers and said orifice between said upper feedback chamber is sized greater than said orifice with said lower feedback chamber.

9. A valve as described in claim 1 wherein said valve is biased to a normally open position between said supply pressure and said control pressure.

10. A control valve as described in claim 1 wherein said valve spool is biased to the position normally closing supply pressure from said control pressure.

11. A solenoid valve as described in claim 1 wherein said solenoid valve has an armature with a coating taken from the group of nickel phosphorous and chrome.

12. A solenoid valve as described in claim 1 wherein a ratio of feedback chamber volume to orifice size allows said lower feedback chamber to provide a damping function.

13. A control valve comprising:
    a solenoid;
    a valve spool moved by said solenoid having three landings and at least two reduced diameter shank portions separating said landings; and
    a valve sleeve encircling said valve spool having a supply pressure inlet juxtaposed by at least one control pressure inlet and one control pressure outlet, said valve sleeve having an exhaust outlet, said valve sleeve providing upper and lower feedback chambers for said valve spool connected by an exterior surface longitudinal slot on said valve sleeve wherein said exterior surface longitudinal slot is connected with said upper and lower feedback chambers by respective orifices and wherein said valve spool meters out flow from said control pressure inlet to said exhaust outlet and from supply pressure inlet to said control pressure outlet, and said exhaust outlet is more adjacent to said upper feedback chamber than said control inlet wherein said exterior surface longitudinal slot fluidly connects the upper feedback chamber with said control pressure inlet via an intermediate orifice intersecting with an interior of said valve sleeve which bypasses said exhaust outlet, and wherein said exterior surface longitudinal slot is connected by said intermediate orifice with a portion of said valve sleeve facing said shank most adjacent to said control inlet and said intermediate orifice connection with said exterior surface longitudinal slot is between said control pressure inlet and said exhaust outlet.

14. A control valve as described in claim 13 wherein said control valve is normally high.

15. A control valve as described in claim 13 wherein said control valve is normally low.

16. A control valve as described in claim 13 wherein said valve sleeve is fabricated from a die cast material.

* * * * *